Oct. 23, 1923.
W. V. VAN ETTEN
1,471,635
DIRIGIBLE HEADLIGHT
Original Filed June 24, 1922
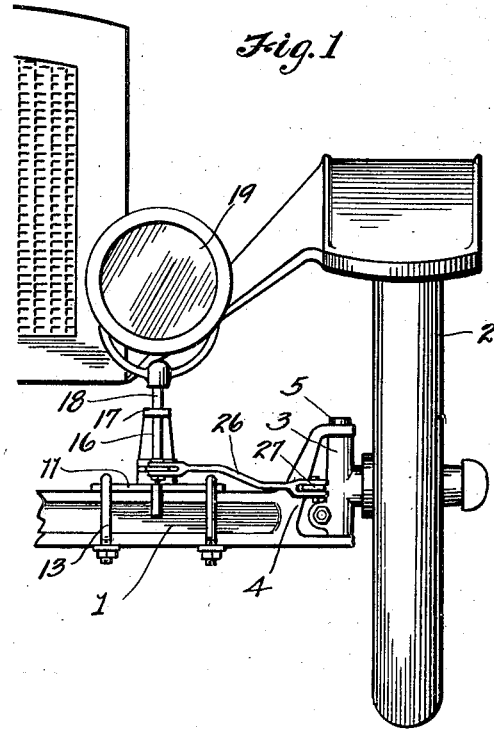
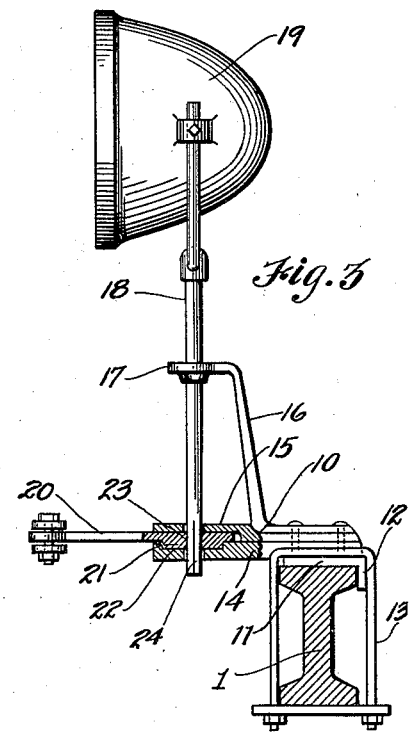
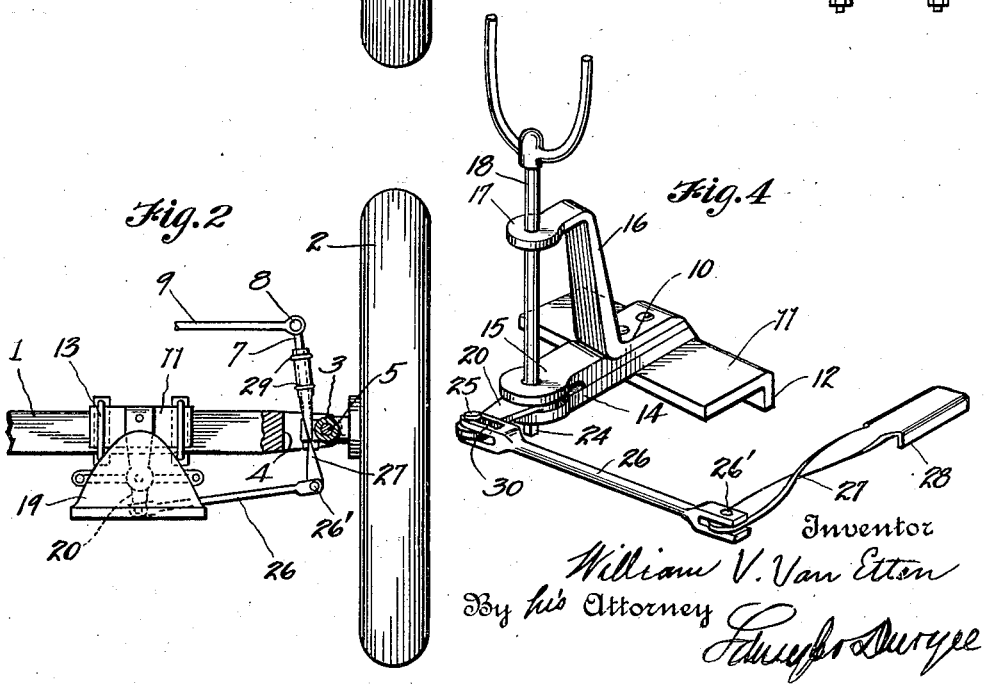
Inventor
William V. Van Etten
By his Attorney Patented Oct. 23, 1923.

1,471,635

UNITED STATES PATENT OFFICE.

WILLIAM V. VAN ETTEN, OF EVERETT, WASHINGTON.

DIRIGIBLE HEADLIGHT.

Application filed June 24, 1922, Serial No. 570,524. Renewed July 16, 1923.

*To all whom it may concern:*

Be it known that I, WILLIAM V. VAN ETTEN, a citizen of the United States, residing at Everett, in the county of Snohomish and State of Washington, have invented a new and useful Improvement in Dirigible Headlights, of which the following is a specification.

My invention relates to improvements in dirigible headlights, and more particularly to headlights of that character for use on automobiles and similar vehicles, and adapted to be controlled from the vehicle steering mechanism.

It is the object of this invention to provide means whereby the direction of light cast from the headlight may, at all times, be automatically maintained in the direction of travel of the steering wheels of the vehicle.

More specifically, it is the object of the invention to provide means for rotatably supporting a vehicle's headlights and to provide mechanism whereby the headlight supports are operatively connected with certain members of the vehicle steering gear whereby the headlights will be automatically rotatated in accordance with the change of direction of travel of the steering wheels of the vehicle.

Other objects of the invention reside in the details of construction of the parts embodied in the invention and in their combination and mode of operation.

In accomplishing these and other objects of the invention, I have provided the improved details of construction, the preferred forms of which are illustrated in the accompanying drawings, wherein—

Fig. 1 is a partial front view of an automobile equipped with a dirigible headlight in accordance with the present invention.

Fig. 2 is a plan view, showing the manner of mounting the headlight and the means for operating it from the front wheel steering knuckle arm.

Fig. 3 is a side view of a headlight and its supporting bracket; parts of the bracket being shown in section for better illustration.

Fig. 4 is a perspective view of a headlight support and light steering mechanism embodied by the present invention.

Referring more in detail to the drawings—

1 designates the front axle of an automobile, which may be of any of the usual types, and 2 a front, steering wheel thereof which is mounted upon the spindle of a steering knuckle 3; the latter being rotatably fixed between the arms of a yoke 4 at the end of the axle by means of a vertical pivot bolt 5. The knuckle is controlled, or steered, by means of a rearwardly extending arm 7 that is fixed within the knuckle and, at its rearward end, is connected pivotally, as at 8, with a steering arm connecting rod 9 which, in turn, is operatively connected with the vehicle steering wheel, not shown, whereby a driver may control the direction of travel of the vehicle.

The parts embodied by the present invention comprise a headlight supporting bracket designated in its entirety at 10, having a base plate 11 adapted to seat upon the axle 1, with a downturned flange 12 engaging with the rearward edge of the axle. U-bolts 13 enclose the axle and opposite ends of the plate to secure the same rigidly upon the axle. Fixed to the upper face of the base plate 11, in superimposed relation, are forwardly extending plates 14 and 15, and an upwardly extended arm 16 provided with a forwardly turned end portion 17 that is vertically alined with the forward end portions of the plates 14 and 15. A vertical shaft, or post, 18 is extended rotatably through openings in these alined ends upon which a headlight 19 is mounted.

The forward end portions of the plates 14 and 15 are spaced apart, and between them is fitted one end of a forwardly extending lever arm 20. This arm has a trunnion 21 at its inner end fitted within a socket 22 in the plate 14 and has a central aperture 23 therein through which the squared lower end 24 of the shaft 18 is extended so that, by movement of the outer end of the lever arm, the shaft will be rotated accordingly to change the direction of the headlight.

The forward end of the lever arm 20 is pivotally connected by means of a bolt 25 with one end of a link 26 which, at its opposite end, is pivotally connected by means of a bolt 26′ with the forward end of a lever 27 that is fixed to the steering knuckle arm 7; the connection being such that movement of the steering knuckle arm effects a like movement of the lever 20 whereby the lamp is rotated.

The lever 27 preferably consists of a flat bar that is twisted at its center, as shown in Figure 2, so that it may be extended through the yoke within the knuckle and without interference, and which has downturned flanges 28 at its inner end edges that fit against opposite sides of the arm to insure rigidity. The lever is fixed to the arm by means of two U-bolts 29 which enclose the parts, as shown in Figure 2.

In order that vibration of the steering knuckle, incidental to travel of the vehicle over rough surfaces, will not impart vibration to the headlight, I provide the link 26 at one end with a slot, as at 30, for receiving the bolt 25, which prevents vibration of the link from effecting the lamp steering arm.

With the parts so constructed and assembled on the vehicle, it is readily apparent that so long as the vehicle travels in a straight, forward course the headlight will cast its light directly forward, but should the steering knuckle be turned in either direction to change the course of the vehicle, the headlight will, by the connecting means provided, be turned accordingly so that its light will be directed in the direction of travel of the wheels.

In this manner the usual disadvantage, resulting from the headlights being rigidly mounted on the vehicle frame, is overcome and safety to the driver while making turns and to others who may be traveling in an opposite direction is insured.

Having thus described my invention, what I claim as new therein and desire to secure by Letters-Patent, is:

The combination with a vehicle having a front axle and a steering wheel supporting knuckle mounted at the end of the axle, provided with a steering arm extending rearwardly therefrom, of a dirigible headlight mechanism comprising a bracket having a base plate overlying the axle and provided with a down turned flange along its inner edge engageable with the edge of the axle, U-bolts enclosing the axle and ends of the base plate to retain the bracket in fixed position, an arm fixed centrally of the base plate and extending forwardly therefrom and provided with a forward end opening, an arm extending upwardly and forwardly from the base plate in vertical alinement with the first named arm, said arms having vertically alined openings in their forward ends, a headlight supporting shaft rotatably mounted in said openings, a lever having its inner end fitted within the forward opening of the first named arm and fixed to the lamp supporting shaft, a lever fixed to the steering knuckle arm and extending forwardly of the axle, and a link pivotally connecting the said lever with the shaft rotating lever.

WILLIAM V. VAN ETTEN.